June 30, 1942.　　　W. M. PARSONS　　　2,288,368
FURNACE
Filed May 31, 1940　　　4 Sheets-Sheet 4
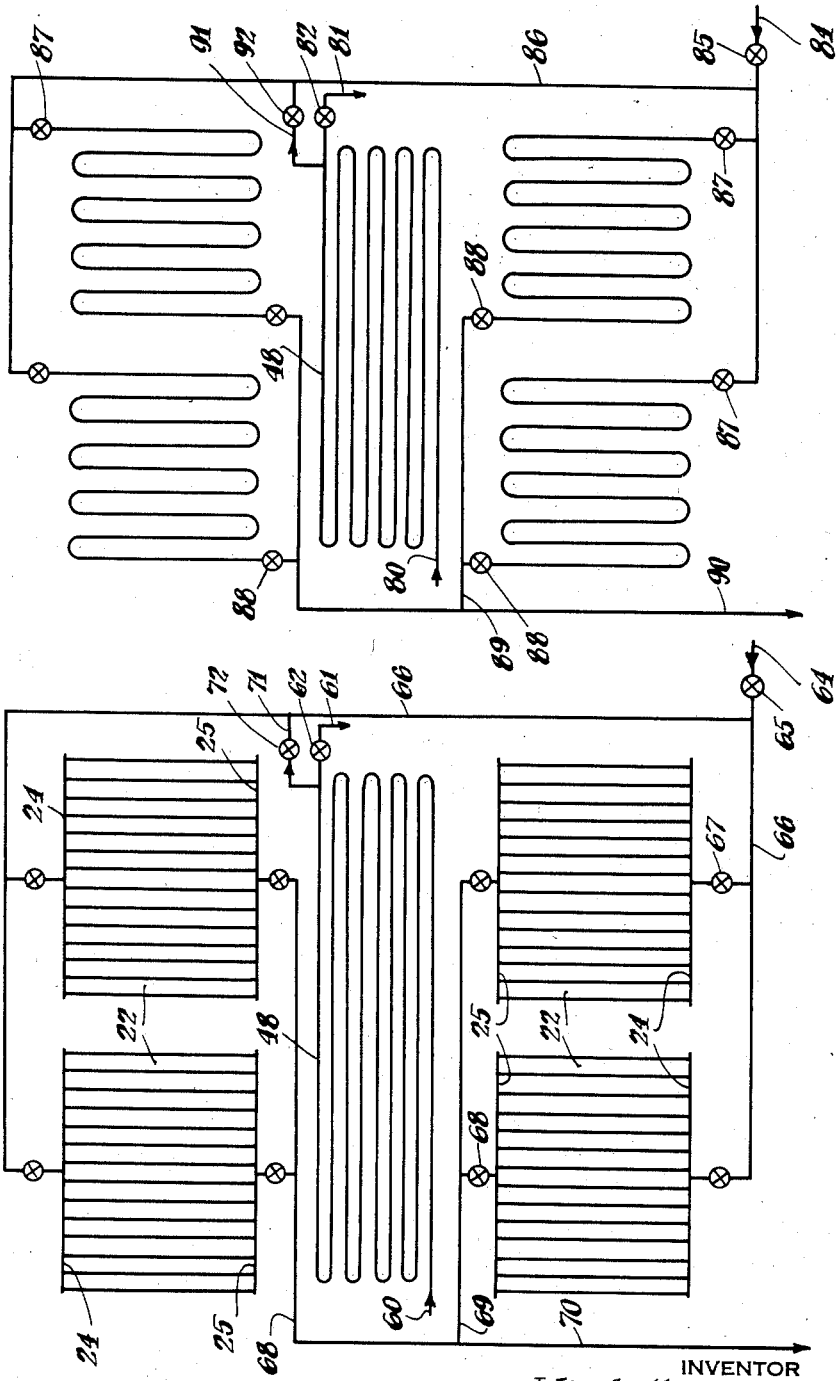
INVENTOR
Winchell M. Parsons
BY
ATTORNEY Patented June 30, 1942

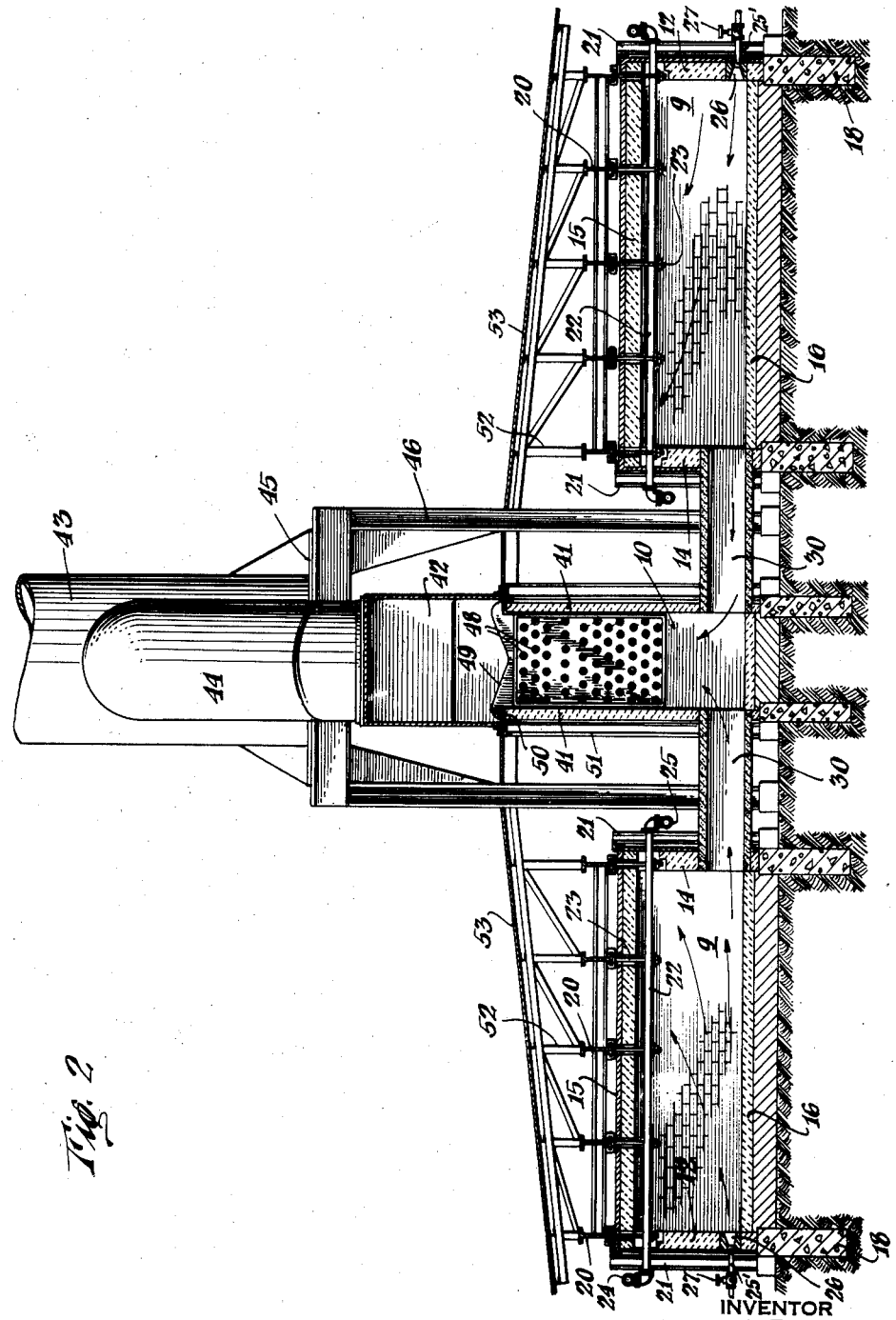

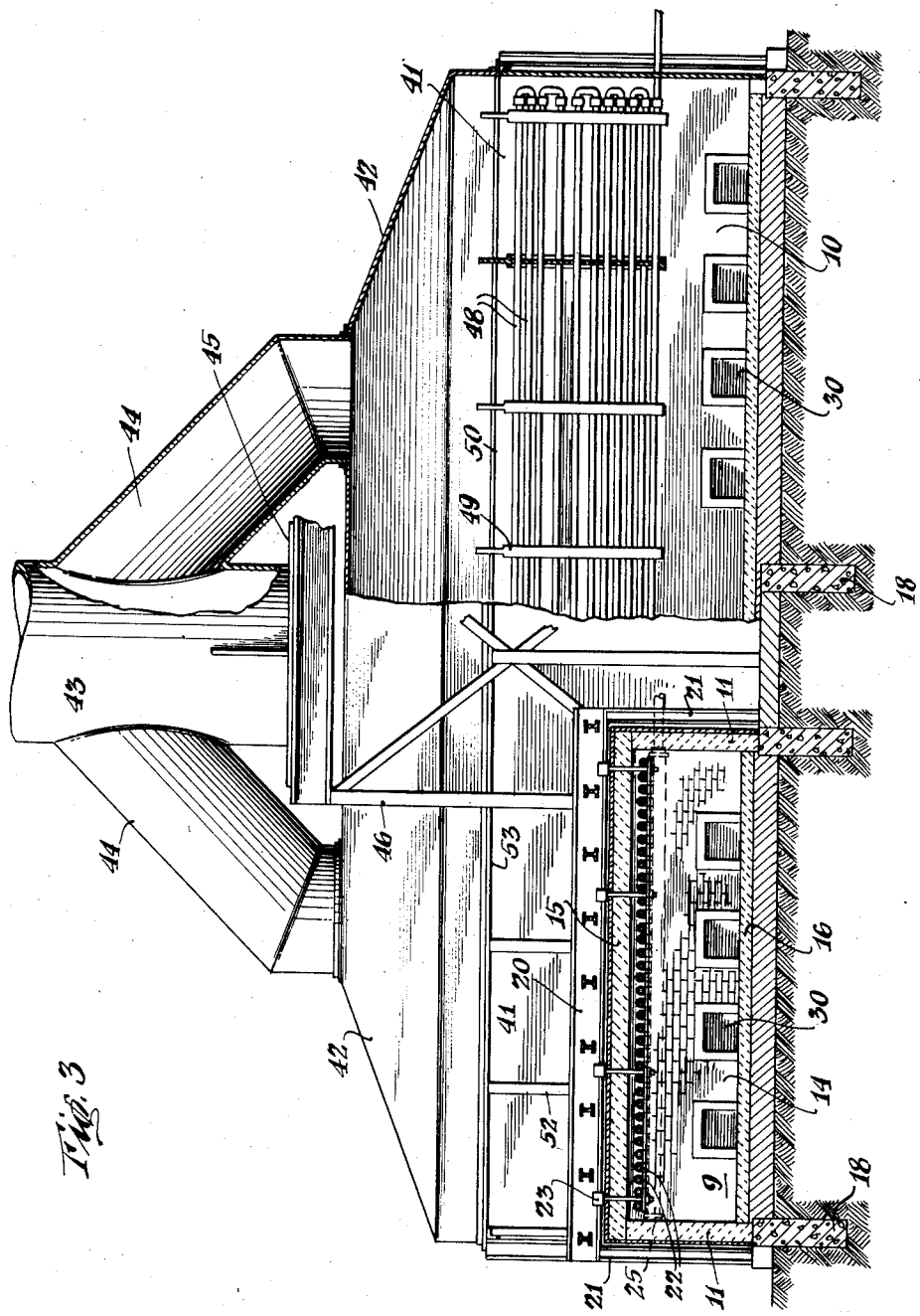

2,288,368

UNITED STATES PATENT OFFICE 2,288,368

FURNACE

Winchell M. Parsons, Alhambra, Calif.

Application May 31, 1940, Serial No. 338,147

1 Claim. (Cl. 196—116)

This invention relates to tube stills and more particularly to furnaces suited to heat a fluid to the high temperatures required for the pyrolytic or catalytic conversion of hydrocarbons.

In certain processes of the above type it is necessary first to heat the hydrocarbon oils to or above the vaporizing temperature, but below the temperature at which conversion takes place under the conditions of operation or, in the case of gases, to preheat the same to a suitable temperature below that at which conversion takes place and subsequently to raise the gases or vapors rapidly and under controlled conditions to conversion temperature. The present invention provides a furnace for this purpose in which the conversion takes place in a split stream utilizing parallel connected banks of tubes so arranged that the tubes are all subjected to identical heating conditions which may be accurately controlled as to total heat transfer and as to heat distribution along the tubes.

An object of the invention is to provide a novel and improved furnace of the above type which is so constructed and arranged that rapid and efficient heat transfer is obtained for heating the fluid to the high temperature required for conversion during its passage through the heating zone.

Another object is to provide a novel and improved furnace of the above type in which a selected bank of tubes may be periodically removed from stream for purposes of reactivation, regeneration, burning out the carbon deposited therein or repair, while maintaining a substantially constant throughput and without materially altering the heat available for the preheating zone.

Another object is to provide a novel and improved furnace of the above type which is suited to the commercial operation of various catalytic or pyrolytic conversion processes.

Another object is to provide a furnace of the above type having novel and improved details of construction and conditions of operation.

Various other objects and advantages will be apparent as the nature of the invention is more fully disclosed.

In one embodiment the furnace is provided with an elongated combustion chamber having a horizontal bank of horizontal tubes extending longitudinally thereof, and having burners located in one end wall to fire substantially parallel to the tubes. The burners are arranged in a horizontal bank extending parallel to the bank of tubes so that the various tubes may be subjected to identical controlled heating conditions.

In the embodiment shown, the converter tubes are located near the roof of the furnace and the burners are arranged to fire parallel to and adjacent the floor so that the floor is heated to radiance thereby. In certain instances the burners may be inclined toward the floor so as to cause the flame and hot combustion gases to sweep along the surface thereof for the purpose above indicated. The converter tubes, which may contain a catalyst, are heated in part by direct radiation from the flame and hot combustion gases, in part by direct radiation from the floor, in part by reflected radiation from the roof of the furnace and in part by convection.

The combustion zone is shown as comprising a plurality of individual combustion chambers. The tubes in each of said combustion chambers are connected to headers to form an individual bank of tubes. The burners may also be connected in groups so that the flow of fluid through the individual banks of tubes and the combustion conditions in the individual chambers may be controlled as desired. This arrangement permits a bank of tubes, together with the corresponding burners, to be shut down when desired without affecting the operation of the remaining banks.

In the embodiment shown, the furnace is provided with four separate combustion chambers so arranged that any three combustion chambers may be operated simultaneously, one chamber being placed on stream prior to the shutting down of a second chamber. In this way the throughput may be maintained substantially constant, as distinguished from the so-called batch operation where the catalyst zone is first heated and is then placed on stream until the temperature has fallen below a predetermined point.

A feature of the invention resides in the reduction of the percentage of the capacity of the furnace which is off-stream for reactivation purposes at any one time, with a consequent increase in over-all on-stream efficiency. In the embodiment shown it will be noted that 75% of the total capacity may always remain in use, thereby making possible a substantially continuous operation in spite of the necessity for periodic reactivation.

In one embodiment four combustion chambers are arranged in pairs on opposite sides of an elongated convection chamber to which they are connected by a plurality of ducts extending from the lower part of each combustion chamber to the lower part of the convection chamber. In the convection chamber the gases pass upwardly in contact with a bank of convection tubes and are removed through a stack located above the chamber.

The arrangement is such that the combustion chambers may be independently operated with a minimum of heat loss. At the same time the construction of the furnace is simplified and the maintenance problems are reduced to a minimum.

Although the novel features which are believed to be characteristic of this invention are pointed out more particularly in the claims appended hereto, the nature of the invention will be better understood by referring to the following description, taken in connection with the accompanying drawings, in which a specific embodiment thereof has been set forth for purposes of illustration.

In the drawings:

Fig. 2 is a vertical longitudinal section taken on the line 2—2 of Fig. 1;

Fig. 3 is a vertical transverse section taken on the line 3—3 of Fig. 1; and

Figs. 4 and 5 are flow diagrams showing representative methods of connecting the various tubes.

Figure 1:
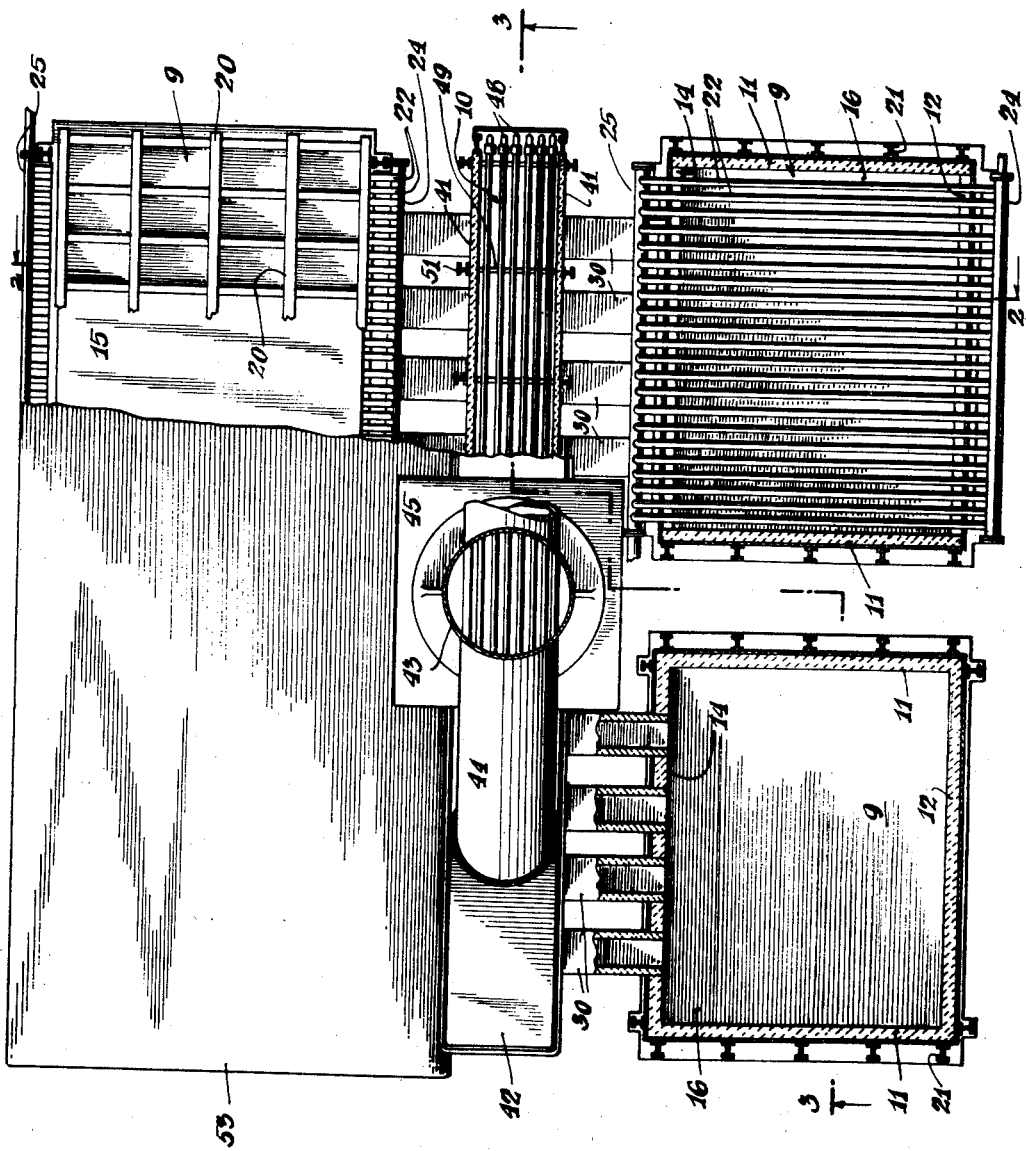
Fig. 1 is a top plan view of a furnace embodying the present invention with parts broken away to show the construction thereof.

In the following description and in the claim various details are referred to by certain specific terms for convenience. It is to be understood, however, that these terms are to be given as broad an interpretation as the state of the art will permit.

Referring to the drawings more in detail, the invention is shown as applied to a furnace comprising a plurality of combustion chambers 9 which are arranged in pairs on opposite sides of an elongated convection chamber 10.

Each combustion chamber 9 comprises a pair of side walls 11, a front wall 12, a rear wall 14, a roof 15 and a floor 16. The combustion chambers are all arranged with their rear walls 14 towards the convection chamber 10. The walls and floor are mounted upon a suitable foundation 18. The roof 15 may be supported by suitable brackets, not shown, from girders 20 carried upon buckstays 21 which are located on the outside of the walls 11.

A horizontal bank of converter tubes 22 is mounted adjacent the roof 15 of each chamber. The tubes are shown as supported by hangers 23 which extend through the roof 15 and are carried by the girders 20. Each bank of converter tubes 22 is shown in Figs. 1 to 4 as parallel-connected to an external inlet header 24 and an external outlet header 25. The arrangement is such that parallel flow of fluid is obtained through the various converter tubes of the banks. The tubes may, however, be connected for series flow if desired as shown in Fig. 5.

A horizontal row of burners 25' is located in the front wall 12 of each combustion chamber 9 near the floor 16. Each burner is adapted to fire through an opening 26 in the wall 12 in a substantially horizontal direction and may be provided with an adjusting device 27. The burners may, however, be inclined slightly downwardly so as to cause the flames to impinge on the floor 16 for heating the same to radiance.

The gases of combustion may be supplied to the convection chamber 10 from each combustion chamber 9 by means of a plurality of ducts 30 which extend horizontally from the lower part of the rear wall 14. The ducts are spaced along the rear wall 14 so as to remove the gases of combustion uniformly from the entire width of the combustion chamber and to assist in maintaining uniform combustion conditions, so that the tubes 22 in each combustion chamber may be heated under substantially identical conditions.

The convection zone 10 is provided with a pair of side walls 41 on which a hood 42 is mounted. A pair of flues 44 supply gases from the hood 42 to a stack 43 which is supported upon a platform 45 carried by posts 46.

In the embodiment shown, the combustion chambers are arranged in pairs, two on each side of the convection chamber 10. Consequently, the ducts 30 enter the convection chamber on opposite sides thereof and at spaced intervals extending substantially along the entire length of the walls 41. The convection chamber 10 contains a bank of convection tubes 48 mounted on hangers 49 which are supported upon an outside framework 50 carried by buckstays 51 extending along opposite sides of the walls 41. The buckstays 51 and the girders 20 also carry a roof truss 52 which is adapted to support a roof 53 for covering the entire furnace.

Two different methods of connecting the various tubes are shown for purposes of illustration in Figs. 4 and 5. Referring to Fig. 4, the fluid is supplied to the convection tubes 48 from a line 60 and is removed from said tubes through a line 61 controlled by a valve 62. The convection tubes 48 are shown as connected for the serial flow of fluid therein. The fluid is shown as supplied to the converter tubes 22 from a line 64 controlled by a valve 65 which is connected by branch lines 66 through valves 67 to the various inlet headers 24 associated with the different banks of converter tubes 22. The headers 24 and 25 are connected for the parallel flow of fluid through the converter tubes of each bank and the various banks are likewise connected through the valves 67 to the lines 66 for the parallel flow of fluid.

The fluid from the discharge headers 25 is removed from the various banks of tubes through valves 68 to discharge lines 69 which communicate with a discharge main 70.

A by-pass 71, having a valve 72, may be connected between the discharge line 61 of the converter section and the line 66 supplying fluid to the converter section to permit the fluid, after being preheated in the convection zone, to be supplied directly to the conversion zone.

The arrangement is such that by opening the valve 72 and closing the valves 62 and 65 the fluid may be supplied from the convection tubes 48 to the converter tubes 22. However, by closing the valve 72 and opening the valves 62 and 65, the convection tubes and the converter tubes may be used for heating different fluids, or the fluid may be removed from the convection tubes for other treatment before being returned to the converter tubes.

It will be noted that any one of the four banks of converter tubes may be removed from stream by closing the associated valves 67 and 68. In this way any one of the banks of tubes may be removed from stream for purposes of reactivation or cleaning, without interrupting the flow of fluid through the remaining banks of tubes. This embodiment is suited to certain catalytic conversion processes wherein the accurate control of the heat distribution along the catalyst tubes is important.

In the embodiment shown in Fig. 5 the fluid is supplied to the tubes 48 through a line 80 and is withdrawn therefrom through a line 81 controlled by a valve 82. Fluid is also supplied to the converter tubes 22 from a line 84 controlled by a valve 85. From the line 84 the fluid is supplied by branch lines 86 through valves 87 to the banks of converter tubes 22. The tubes 22 in each bank are shown as serially connected. The fluid, after passing through the converter tubes 22 is removed through valves 88 to discharge lines 89 and thence to a main 90. A by-pass 91, controlled by a valve 92, may be used to pass fluid directly from the tubes 48 to the tubes 22 as above mentioned.

In the embodiment shown in Fig. 5, the converter tubes of the various banks are connected in series for the serial flow of fluid therein. However, the fluid is passed in parallel through the various banks of conversion tubes, the arrangement being such that any one of the banks of tubes may be removed from stream by closing the associated valves 87 and 88 while maintaining the parallel flow of fluid through the remaining banks. The fluid may be passed directly from the convection tubes 48 to the converter tubes 22 or may be removed for intermediate treatment as desired or the convection and conversion zones may be used for the treatment of different fluids.

This embodiment is particularly suited to certain pyrolytic conversion processes and permits a selected bank of tubes to be removed from stream for cleaning purposes while maintaining the flow through the remaining banks unchanged.

In the operation of this furnace, burners 25 may be so adjusted as to maintain the floor 16 in radiant condition, whereby heat is transferred to the tubes 22 by radiation from the flame and from the hot combustion gases, by radiation from the surface of the floor 16 and by reflection from the roof 15. Heat is also transferred to the tubes 22 by convection from the combustion gases. It will be noted, however, that the main body of combustion gases passes directly from the burners 25 to the ducts 30 without first contacting with the tubes 22. This arrangement prevents the tubes from burning out due to contact with the flame and also permits the maximum heat transfer to be obtained. The burners are preferably adjusted so as to maintain a sheet of incandescent flame across the entire floor of the furnace so that the maximum radiation is obtained therefrom.

It is to be noted that the burners 25 fire parallel to the tubes 22. In this way the various tubes may be heated under identical conditions. The heat distribution along the tubes 22 may be controlled by adjusting the devices 27 and the inclination of the burners so as to vary the rate of combustion, the length of the luminous portion of the flame and the point of contact of the flame with the floor 16.

This feature is of particular importance in the case of the parallel connection of the tubes 22 as shown, for example, in Fig. 4. When the tubes are connected in this way for the parallel flow of fluid, the heat control means above mentioned permits the fluid in all of the tubes to be heated under identical conditions. Consequently, the rate of heat transfer and the temperature gradient of the fluid as it passes along the tubes may be controlled as desired.

The adjustment is also important in the case of series connected tubes inasmuch as the maximum rate of heat transfer can be employed without danger of overheating the fluid and causing carbonization.

In certain instances, however, particularly when the series connection of Fig. 5 is used, it may be desirable to fire normal to the converter tubes so as to heat the fluid therein as uniformly as possible.

The combustion gases from all of the individual combustion chambers 9 pass to the convection zone 10. Consequently, the heat transferred to the tubes 48 in the convection zone is dependent only upon the total quantity of gases supplied thereto. This factor remains the same regardless of which one or more of the particular combustion chambers may be shut down or removed from stream at any particular instant. For example, the furnace may be operated so that any three combustion chambers remain on stream while the fourth chamber is removed for purposes of reactivation, cleaning or repair. The quantity of combustion gases supplied to the convection zone thus remains substantially constant and the furnace may be operated as a constant throughput while the individual banks of converter tubes are removed periodically for reactivation purposes. The convection tubes 48 are shown as connected for the serial flow of fluid therein but it is to be understood that they may be connected in other ways if desired.

In certain conversion operations the convection tubes may be used to preheat the fluid prior to the passage thereof through the conversion tubes 22. It is to be understood, however, that the convection tubes 48 and the conversion tubes 22 may be used for heating different fluids or for different purposes as desired.

By spacing the various ducts 30 along the entire length of the convection zone 10, the tubes 48 are heated under uniform conditions throughout. In this way a maximum heat transfer is obtained from the combustion gases to the tubes 48. It is to be understood, of course, that the number of combustion chambers may be increased or varied as desired, and that four combustion chambers arranged on opposite sides of the convection chamber 10 have been shown for purposes of illustration only. Furthermore, the number and spacing of the ducts 30 leading to each combustion chamber may be varied as desired.

In certain instances, the combustion chambers may all be located on the same side of the convection chamber 40 with the ducts 30 spaced along the convection chamber and entering the convection chamber on only one side.

The above described furnace is particularly applicable to pyrolytic and catalytic conversion processes for the treatment of hydrocarbons, but is capable of various other uses, modifications and embodiments as will readily appear to a person skilled in the art and is only to be limited in accordance with the following claim.

What is claimed is:

A furnace for heating fluids comprising an elongated convection chamber containing a bank of horizontal convection tubes, a plurality of separate combustion chambers spaced along each side of said convection chamber in opposite pairs, each combustion chamber comprising front and rear walls and a pair of side walls forming a substantially closed chamber with the rear wall positioned toward said convection chamber and carrying a horizontal bank of roof tubes extending between said front and rear walls, a horizontal row of burners located in the front wall of each combustion chamber near the floor thereof, firing substantially parallel to said converter tubes and toward said rear wall, and a plurality of ducts spaced along the lower part of the rear wall of each combustion chamber, said ducts being substantially parallel and extending directly into the lower part of the side of said convection chamber so as to supply gases to said convection chamber uniformly along the length thereof for heating the convection tubes therein and ducts withdrawing combustion gases vertically from the top of said convection chamber after passage over said convection tubes, said ducts being spaced along the top of said convection chamber, one duct being opposite each of said pairs of combustion chambers to receive the combustion gases therefrom with a minimum change in direction.

WINCHELL M. PARSONS.